Feb. 6, 1945. H. H. BLALOCK 2,368,631
LISTER ATTACHMENT FOR TRACTORS
Filed May 26, 1943 3 Sheets-Sheet 1

Fig. 1.

INVENTOR
Henry H. Blalock
BY
Attorney

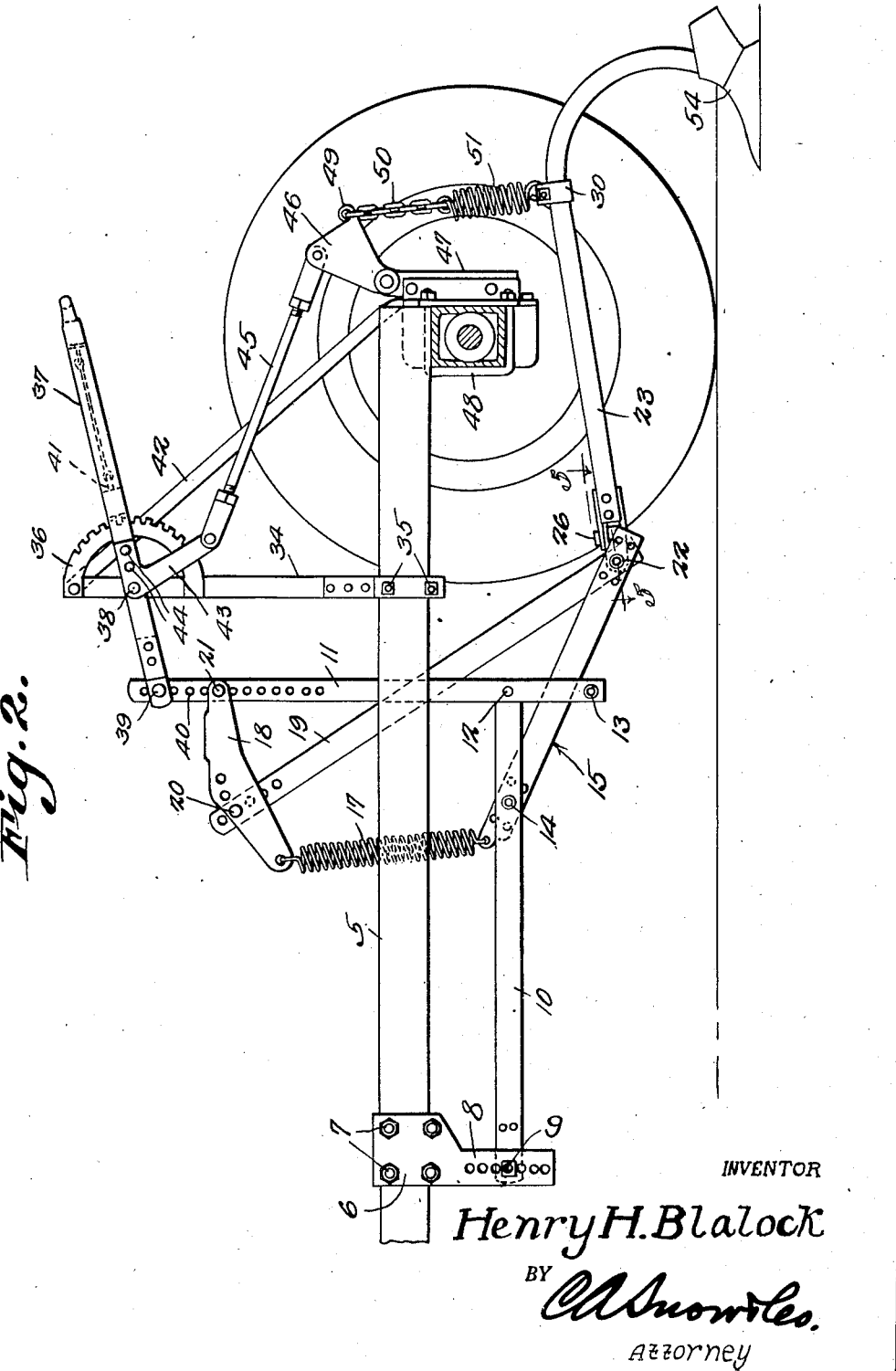

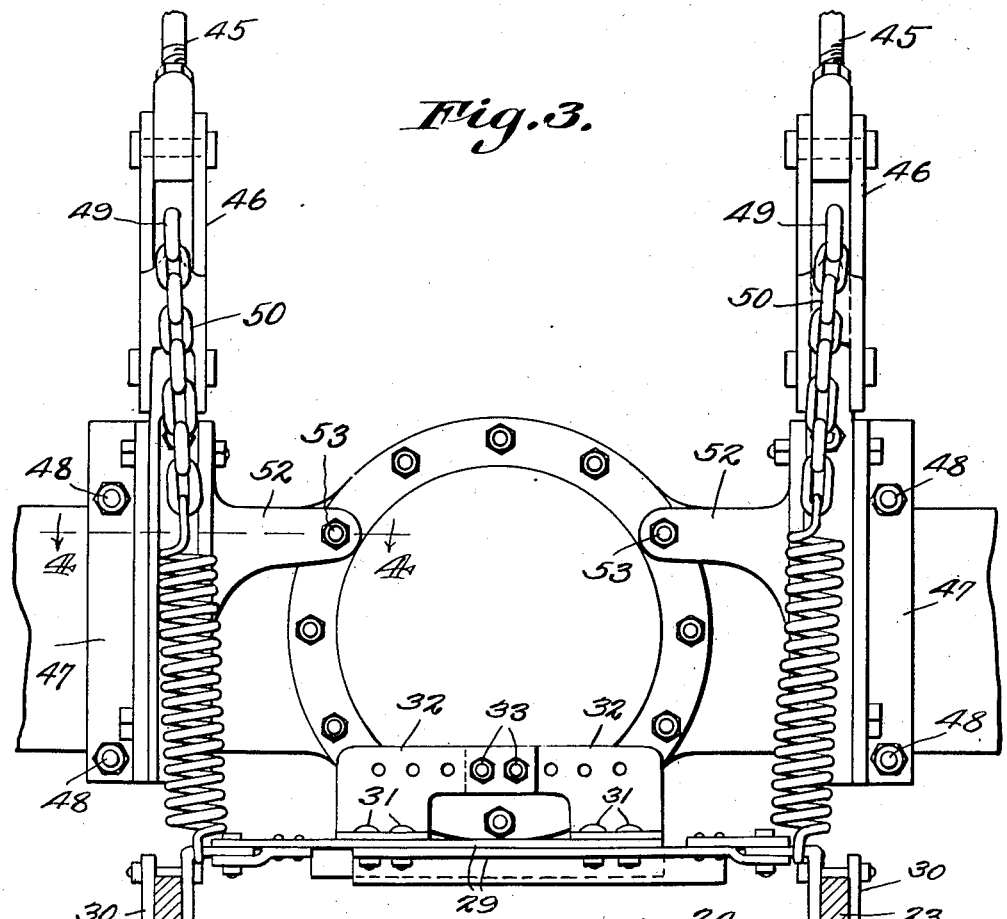
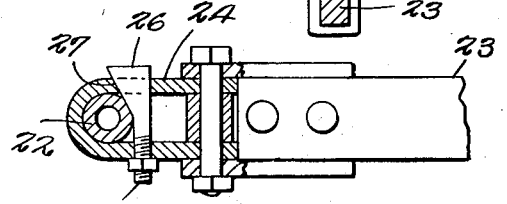
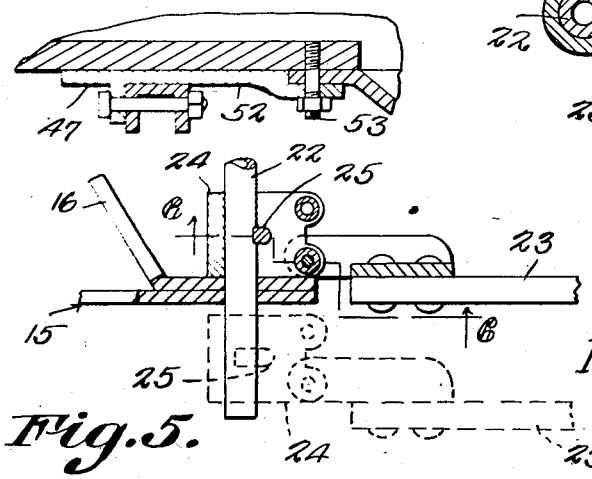

Patented Feb. 6, 1945

2,368,631

UNITED STATES PATENT OFFICE 2,368,631

LISTER ATTACHMENT FOR TRACTORS

Henry H. Blalock, Abernathy, Tex., assignor of twenty-four per cent to Elaine Halford, Abernathy, Tex., and fifty-two per cent to A. C. Hendricks, Flying H, N. Mex.

Application May 26, 1943, Serial No. 488,570

2 Claims. (Cl. 97—47)

This invention relates to a two-row lister attachment for tractors, the primary object of the invention being to provide a lister structure which may be secured to the usual tractor frame, for plowing purposes, means being provided whereby the plow beams may be adjusted with respect to each other, thereby adapting the device for use on tractors of various constructions.

An important object of the invention is to provide an attachment of this character wherein the plow beams may be adjusted, so that the blades mounted thereon may be set to operate at predetermined depths.

Another object of the invention is to provide means whereby the operator of a plow may adjust the blades for depth, while the plow is in operation, thereby insuring the formation of furrows of uniform depths.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a plan view of a lister attachment, constructed in accordance with the invention, as secured to the frame of a tractor.

Figure 2 is a side elevational view thereof.

Figure 3 is a rear elevational view of the device illustrating the means for attaching the plow beam of the attachment, to the tractor.

Figure 4 is a sectional view taken on line 4—4 of Figure 3.

Figure 5 is a sectional view taken on line 5—5 of Figure 2.

Figure 6 is a sectional view taken on line 6—6 of Figure 5.

Referring to the drawings in detail, the reference character 5 designates the side rails of the chassis of a tractor, to which the brackets 6 are secured, as by means of the bolts 7.

These brackets have extensions 8 that extend downwardly an appreciable distance, the extensions being formed with a plurality of openings for the reception of the bolts 9, that connect the bars 10 of the attachment, to the brackets. In view of the fact that the attachment embodies identical bars, rods and levers, at opposite sides of the tractor frame, the structure at one side of the tractor frame only, will be described in detail.

The bars 10 at opposite sides of the attachment, have pivotal connection with the bars 11 at 12, the bars 11 at opposite sides of the tractor frame, being connected by the rod 13 which is shown as extended through openings in the lower ends of the bars 11, where they are secured against displacement.

The bars 10 at opposite sides of the tractor are connected by the rod 14, the rod 14 also providing a pivot for the rectangular frame 15, which includes cross-bars 16 that brace the frame 15, as clearly shown by Fig. 1 of the drawings.

The ends of the side bars of the rectangular frame 15, extend beyond the rod 14, where they are provided with openings in which the lower ends of the coiled springs 17 are held. The upper ends of the coiled springs 17 are secured within openings of the connections 18 that are pivotally connected with the bars 19. The connecting plates 18 are formed with a plurality of openings to accommodate the bolts 20 that extend through openings in the bars 19, pivotally connecting the plates 18 to the bars 19. These connecting plates connect the bars 11 and 19 and, as shown, are provided with bolts 21 that extend through openings of the bars 11, adjusting the tension of the springs 17. The lower ends of the bars 19 have pivotal connection with the rod 22 on which the frame 15 is mounted. This rod 22 also provides a support for the front ends of the plow beams 23 which have connection with the brackets 24, that in turn are mounted for pivotal movement on the rod 22. These brackets 24 are of novel construction, and embody lengths of sheet metal material bent upon themselves as shown by Fig. 6. Openings are formed in the brackets 24, for the reception of the bolts 25 that have wide heads 26, which heads are formed with inclined surfaces 27 that bear against the rod 22, holding the brackets in position, and at the same time permitting of rotary movement of the brackets with respect to their supporting rod 22.

The plow beams 23 are held in proper spaced relation with respect to each other, by means of the adjustable cross-member 28 which embodies overlapping bars 29 connected to the substantially U-shaped brackets 30 that are bolted to the plow beams 23. The overlapping bars 29 are formed with a plurality of openings, for the reception of the bolts 31, whereby the bars 29 may be secured in various positions of adjustment with respect to each other. The bars 29 are further supported by the overlapping angle plates 32 which are bolted to the bars 29 by the bolts 31. The overlapping portions of the plates 32 are secured together, by means of the bolts 33, which may be positioned to increase, or decrease the width between the plow beams 23.

The reference character 34 indicates upstanding bars, which are bolted to the side rails of the tractor by means of the bolts 35. These uprights 34 are formed with curved rack bars 36 and provide supports for the levers 37 that are pivotally connected thereto, by means of the pivots 38. The forward ends of the levers 37 have pivotal connection with the bars 11, through the pivot pins 39 which may be positioned in any of the openings 40, formed in the bars 11, and thereby adjust the operation of the device to vary the initial depth of operation of the plow. A spring-pressed pin 41 is mounted on each lever 37 and cooperates with the teeth of the curved rack bars 36 in holding the levers and bars connected therewith, in their positions of adjustment.

Brace bars 42 are bolted to the upper ends of brackets 47 and extend upwardly from the brackets 47 mounted on the axle housing, the upper ends of the bars 42 being connected with the upper ends of the uprights 34. Bell crank arms 43 are riveted to the levers 37, by means of the rivets 44 and move with the levers 37. Connecting rods 45 have pivotal connection with the bell crank arms 43, and extend rearwardly, where they connect with the plates 46 that are pivotally connected with the brackets 47 that in turn are bolted to the rear axle housing of the tractor, by means of U-bolts 48. Fingers 49 are formed at one corner of each of the plates 46, the fingers 49 providing means for securing the chains 50 to the plates 46. Coiled springs 51 are connected with the lower ends of the chains 50, the coiled springs being also connected to the brackets 30, as clearly shown by Fig. 3 of the drawings.

The brackets 47 are also formed with inwardly extended portions 52, that are bolted to the differential housing, by means of bolts 53. Thus it will be seen that due to this construction, by moving the levers 37, the springs 51 may be tensioned to elevate the plow blades, which are indicated by the reference character 54.

It might be further stated that reconstruction of the brackets 24, permits the plow beams to be moved toward or away from each other, by merely removing the pivot pins between the plow beams and brackets, and replacing them in other openings of the brackets.

In the operation of the device, it is obvious that when the levers 37 are moved downwardly, the forward ends of the plow beams 23 are moved upwardly through the various pivoted bars which connect the levers with the plow beams 23, elevating the plow blades.

By moving the levers in the opposite direction, the plow beams and their plows will be lowered.

What is claimed is:

1. A lister attachment for tractors, comprising uprights adapted to be secured to the side rails of a tractor, levers pivotally mounted at the upper ends of the uprights, vertical bars to which said levers are pivotally connected, a rectangular frame including side bars and cross-bars, a horizontal rod connecting the lower ends of the bars of the frame, plow beams, means for adjustably connecting the forward ends of the plow beams to said rod, forwardly inclined bars pivotally connected with the rod, plates pivotally connected with said vertical bars and being pivotally connected with the forwardly inclined bars, coiled springs adapted to connect the forward ends of the frame and forward ends of the plates, yieldably connecting the frame and plates, horizontal bars having pivotal connection with the frame and vertical bars, means for pivotally connecting the forward ends of the horizontal bars to the side rails of the tractor to which the device is attached, and yieldable means including connecting-rods and springs, operated by movement of said levers, for raising and lowering the rear ends of the plow beams.

2. A lister attachment for tractors, comprising plow beams and plow beam adjusting means including uprights connected to the side rails of the chassis of the tractor, parallel horizontal bars mounted under the side rails of the tractor, means for pivotally connecting the front ends of the parallel bars to the tractor, a rod connecting the parallel bars at points adjacent to the rear ends thereof, a rectangular frame mounted under the tractor frame and being pivotally connected with said rod, said frame being also connected to the front ends of said plow beams, vertical bars pivotally connected with the rear ends of the parallel horizontal bars, a rod connecting the lower ends of the vertical bars at points below the rectangular frame, providing a stop limiting the downward movement of the rectangular frame, pivoted yieldable means connecting the front end of the rectangular frame and vertical bars, levers mounted on the uprights and having pivotal connection with the vertical bars, whereby said vertical bars are raised and lowered, and means including a rod and coiled spring, connecting the levers with the plow beams, for raising and lowering the rear ends of the plow beams simultaneously with the movement of the front ends thereof.

HENRY H. BLALOCK.